(12) United States Patent
Ylinen et al.

(10) Patent No.: US 7,610,995 B2
(45) Date of Patent: Nov. 3, 2009

(54) AUTOMATED TRANSPORTATION SYSTEM WITH USER-CONTROLLED TRANSPORT SELECTION

(75) Inventors: Jari Ylinen, Hyvinkää (FI); Risto Kontturi, Rajamäki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/889,223

(22) Filed: Aug. 9, 2007

(65) Prior Publication Data
US 2008/0067013 A1 Mar. 20, 2008

Related U.S. Application Data

(63) Continuation of application No. PCT/FI2006/000054, filed on Feb. 16, 2006.

(30) Foreign Application Priority Data
Mar. 15, 2005 (FI) .................................. 20050279

(51) Int. Cl.
*B66B 1/18* (2006.01)
(52) U.S. Cl. ...................... 187/382; 187/381; 187/388; 187/391
(58) Field of Classification Search ......... 187/380–388, 187/391–396, 247
See application file for complete search history.

(56) References Cited

U.S. PATENT DOCUMENTS

| 4,852,696 | A | * | 8/1989 | Fukuda et al. | ............... 187/392 |
| 4,979,594 | A | * | 12/1990 | Begle et al. | ................... 187/380 |
| 4,989,694 | A | * | 2/1991 | Ueshima et al. | ............... 187/380 |
| 5,192,836 | A | | 3/1993 | Schroder et al. | |
| 5,689,094 | A | | 11/1997 | Friedli et al. | |
| 5,780,789 | A | * | 7/1998 | Tsuji | ............................ 187/382 |
| 6,293,368 | B1 | * | 9/2001 | Ylinen et al. | ................ 187/382 |
| 6,345,697 | B1 | * | 2/2002 | Siikonen | ...................... 187/382 |
| 6,394,231 | B1 | | 5/2002 | Schuster et al. | |
| 7,036,635 | B2 | * | 5/2006 | Rintala et al. | ................ 187/396 |
| 7,353,915 | B2 | * | 4/2008 | Zaharia et al. | ............... 187/388 |
| 7,377,364 | B2 | * | 5/2008 | Tyni et al. | .................... 187/380 |
| 2003/0008507 | A1 | | 1/2003 | Bell et al. | |
| 2003/0085079 | A1 | | 5/2003 | Koehler et al. | |
| 2008/0011557 | A1 | * | 1/2008 | Hakala et al. | ................ 187/387 |

FOREIGN PATENT DOCUMENTS

WO  WO-2005/019084 A1  3/2005

* cited by examiner

*Primary Examiner*—Jonathan Salata
(74) *Attorney, Agent, or Firm*—Birch, Stewart, Kolasch and VBirch, LLP

(57) ABSTRACT

A method and a system for responding to a service request sent to a transportation service, determining one or more alternatives as a transportation device for the user and selecting a personal transportation device. An automated transportation system according to the invention may contain a plurality of elevators in an elevator group, a passenger terminal device for reserving elevators for use by passengers, and an elevator group control system responsive to the passenger terminal device for controlling the elevators. The method of the invention involves entering a personal service request via the terminal device, determining on the basis of the service request at least one alternative as a transportation device for the user, and selecting via the terminal device one of the alternatives as the transportation device.

16 Claims, 3 Drawing Sheets

US 7,610,995 B2

AUTOMATED TRANSPORTATION SYSTEM WITH USER-CONTROLLED TRANSPORT SELECTION

Figure 1:
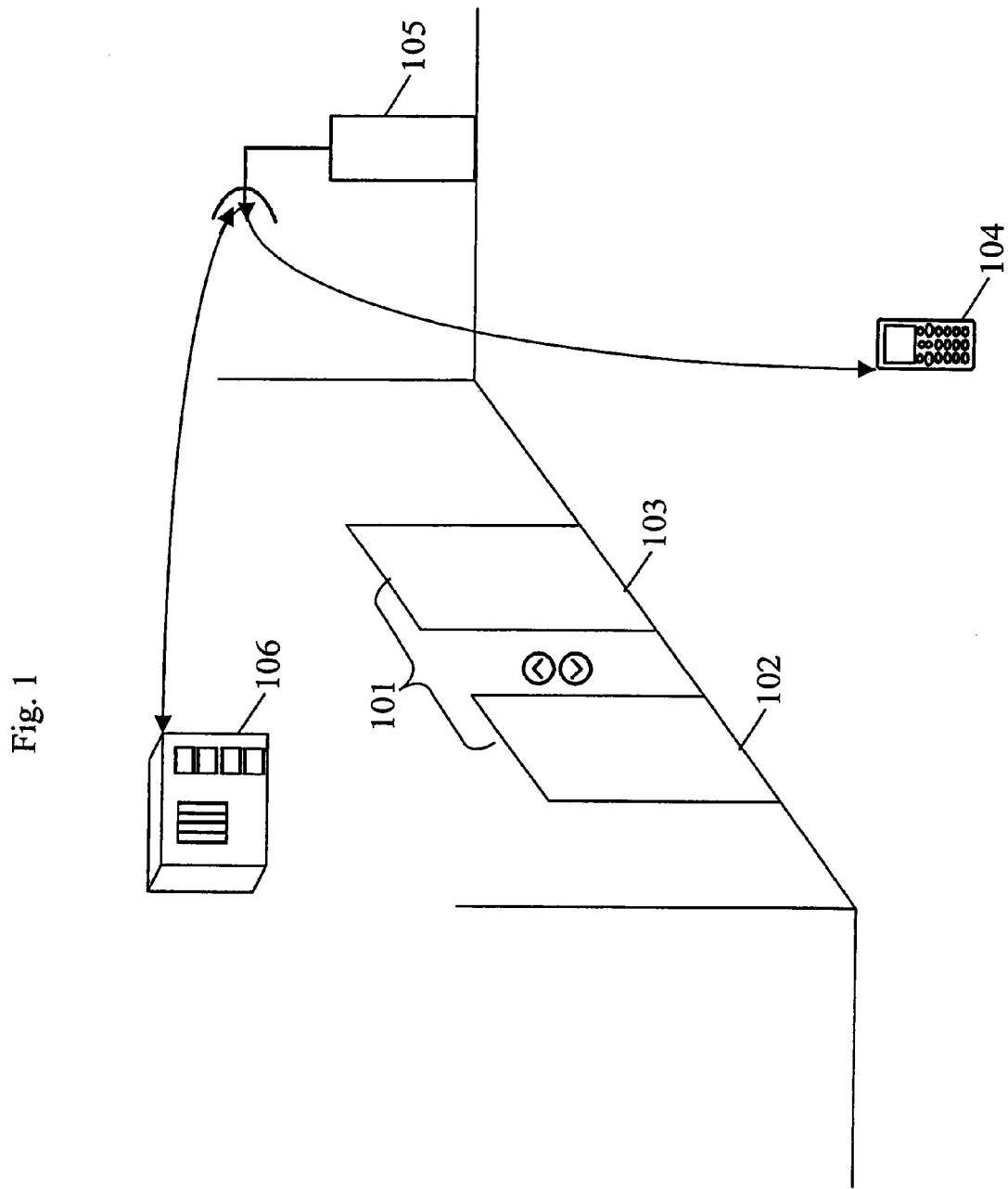

This application is a Continuation of copending PCT International Application No. PCT/FI2006/000054 filed on Feb. 16, 2006, which designated the United States, and on which priority is claimed under 35 U.S.C. § 120. This application also claims priority under 35 U.S.C. § 119(a) on Patent Application No(s). 20050279 filed in Finland on Mar. 15, 2005. The entire contents of each of the above documents is hereby incorporated by reference.

FIELD OF THE INVENTION

The present invention relates to a passenger transportation service. In particular, the present invention relates to a method for responding to a service request sent to a transportation system, determining one or more alternatives as transportation means for the user and selecting a personal transportation device.

BACKGROUND OF THE INVENTION

An essential function in the operation of a personal transportation service, e.g. an elevator system, is call input and the related control of the movement of transportation devices. For example, in an elevator system call input has traditionally been arranged by providing each floor with up-down call buttons, by means of which an arriving elevator customer indicates a desired traveling direction. In addition, the elevator car has to be provided with a control panel tailored for the place of installation of the elevator system and comprising a button for each floor, of which the elevator passenger presses the one corresponding to his/her destination floor. Thus, in the traditional call input method, the elevator customer has to enter two calls. First, an elevator has to be called by one press of a call button to the floor where the customer is located. In addition to this, a second press of a call button is needed in the elevator car.

A call input method whereby the elevator passenger selects his/her destination floor while still in the elevator lobby outside the elevator is called destination allocation. In destination floor elevator systems, each passenger wishing to have a ride on an elevator gives on the landing his/her destination floor to which this passenger is traveling by elevator. Thus, the number of calls to be input per elevator trip in destination floor elevator systems is one instead of the earlier two calls.

The destination floor is given e.g. by using a destination call device specially reserved for this purpose, which device is an extended version of the landing call button and is mounted at the landing. In the destination call device, the actual landing call button has been extended with a more comprehensive user interface such that the user, i.e. elevator passenger, can indicate the floor to which he/she wishes to ride on an elevator. The destination call device may also be a passenger terminal device designed for this purpose or it may be e.g. the user's own mobile phone.

The destination call is sent to the elevator control system for elevator allocation. The elevator control system receives the call and tries to decide which one of the elevators in the elevator group can best serve the person having entered the call. In response to the destination call sent by it, the passenger terminal device receives information from the elevator control system regarding the elevator serving the call. The information received by the user may comprise e.g. information as to which one of the elevators has been allocated to the user and where it is located relative to the user. The information may additionally comprise an estimated waiting time or it may be a signal announcing the arrival of the allocated elevator at the floor of departure.

In the case of automated transportation systems, such as elevator systems, it is almost impossible for the service user him/herself to influence the selection of the transportation device. When the user gives his/her destination floor, the elevator control system allocates to the user the elevator most suitable from the point of view of the elevator system and guides the passenger to this elevator. In the prior-art destination floor elevator system, each passenger traveling on the elevator must independently inform the destination floor elevator system as to his/her own destination floor. This means that each passenger has to wait independently for his/her own elevator expressly allocated to him/her, even if the passenger would like to have his/her ride on another elevator going in the same direction. Thus, there arises the problem of how the users could themselves stop an elevator going past the floor and have a ride on it to the destination floor.

On the other hand, if passengers do not await the elevator allocated to them but select another elevator, then the elevator system receives incomplete information as to which elevator the passenger actually uses to travel to a given destination floor. The incomplete information received by the destination floor elevator system and especially its control system leads to a reduction in the level of service provided by the elevator system to the passengers. It is obvious that, if it were possible for the elevator system to offer the user more than one alternative as an allocated elevator, the elevators and elevator system could provide better service to the passengers.

Moreover, the information provided by the system regarding the elevator allocated to the user may be in a form difficult to understand, in which case the user will find the instructions given by the system unclear and difficult to follow. The user may also get frustrated waiting for the elevator he/she has been instructed to use, particularly if another elevator stops at the floor before the elevator intended for the user.

In prior-art solutions, a fundamental problem is that the user is not given a possibility to have a say on the selection of an elevator according to his/her own personal needs. In existing transportation systems, the user needing the service can not be offered the best transportation means selected according to his/her personal requirements, but the user has to travel on the elevator allocated to him/her by the elevator system. The user might e.g. want to ride on an elevator that provides a total traveling time as short as possible. Alternatively, the user might prefer to select an elevator that provides a total traveling time as short as possible or the user might want to travel on a panoramic elevator.

OBJECT OF THE INVENTION

The object of the present invention is to implement a method and system for controlling a transportation system in such a way that the users needing the service have a possibility to influence the selection of the transportation device, the above-mentioned problems of prior-art solutions being thus avoided.

BRIEF DESCRIPTION OF THE INVENTION

As for the features of the invention, reference is made to the claims. Inventive embodiments are also presented in the description part and drawings of the pre-sent application. The inventive content disclosed in the application can also be defined in other ways than is done in the claims below. The inventive content may also consist of several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic concept of the invention, features of different embodiments of the invention can be applied in conjunction with other embodiments.

The aim of the invention is to offer the user of an automated transportation system, such as an elevator system, a possibility to select a desired transportation device from among predetermined alternatives. Thus, the system basically offers the user the alternatives most suitable for the system, and from these the user can select the most suitable transportation device according to his/her own personal needs.

Using a passenger terminal device, the user of the elevator system enters a destination call which is transmitted to the elevator control system for elevator allocation. Along with the destination call is also sent data indicating the user's starting floor. In particular, the terminal device may be provided with a user interface containing a menu or key for the transmission of a destination call. The elevator control system gives the user's terminal device at least one alternative for the selection of a desired elevator car. Of the alternatives thus offered, the user selects via the terminal device a desired elevator car, which the control system then allocates to the user.

In an embodiment of the invention, in connection with the service request, the user gives the elevator control system other criteria besides the destination floor for use in the allocation of alternative elevator cars. Such criteria may be e.g. waiting time for transportation device, degree of admission of device, total traveling time, possible cost, device type (panoramic or ordinary elevator), device mode (steady or sportive), location of transportation device (e.g. proximity), energy consumption of transportation device (the user may e.g. want a low energy consumption when moving from place to place) or outfit of device (interior decoration or additional properties). It is additionally possible to use other kinds of criteria that the passenger may wish to use when selecting a transportation device according to his/her own personal preferences. The elevator control system of the invention uses these criteria in determining elevator alternatives for the user.

In an embodiment of the invention, the user can additionally select among different functional modes the alternative that suits him/herself best. The functional mode may e.g. determine the manner in which the information concerning the selection of an elevator is presented on the terminal device. For example, the user may want all information to be presented visually in the form of images, in a completely numeric form or by means of an audio signal. If desirable, the user can also select e.g. a mode for an aged person, a handicapped person or a child user, in which case the elevator door can be kept open for a somewhat longer default time than usual. Other special functions can also be programmed for each functional mode.

In another embodiment of the invention, the user can select the traditional mode, wherein the user enters his/her destination floor via the terminal device, whereupon the elevator control system allocates the most suitable elevator to the user and no separate alternatives are offered. In this case, the user receives on his/her terminal device instructions indicating e.g. which one of the elevators in the elevator lobby has been allocated to the user and where it is located relative to the user. The information may additionally comprise an estimated waiting time or it may be a signal announcing the arrival of the allocated elevator at the starting floor.

Usually there are one or more persons using or wanting to use the elevator system at the same time, so that, as regards the control system, they have to be served in a given order. The persons using or wanting to use the same elevator can be arranged to form the route of the elevator in question. Based on these data, the elevators in the elevator group are sent information according to the route of each elevator, and the elevators accordingly move to the stopping floors along their routes, which may consist of several stopping floors, where the persons enter or leave the elevator.

In the transportation system of the invention, the user may him/herself select a desired alternative as a transportation means from among the alternatives provided by the control system. It is also possible for the user to give criteria according to his/her own needs to the control system, which, in accordance with these criteria, offers the user the alternatives most suitable as a transportation device for the user. The user is thus able to influence elevator allocation already when the transportation device alternatives are being selected. Moreover, the user him/herself makes his/her final selection from among the alternatives provided, whereupon the control system registers the elevator selected by the user. The elevator system according to the present invention provides user-friendly service to passengers and allows the user to make the final decision as to which elevator he/she will select.

The solution described has the further advantage that the user is more likely than before to take the elevator allocated to him/her, because he/she has selected the desired elevator him/herself. Thus, the elevator control system is able to keep reliable records regarding passengers, the elevators selected by them and the destination floors selected by passengers. As the information available regarding the numbers of passengers and their destination floors is more accurate, the service level of the elevator system can be further improved.

LIST OF FIGURES

Figure 2B:
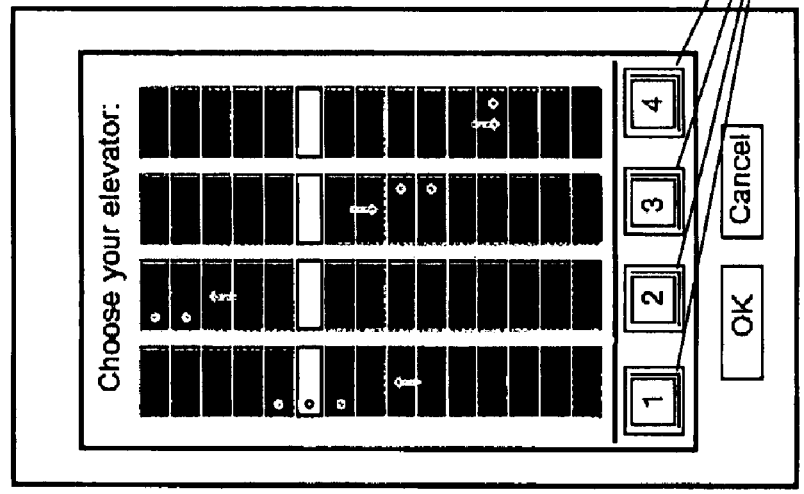
Figure 2A:
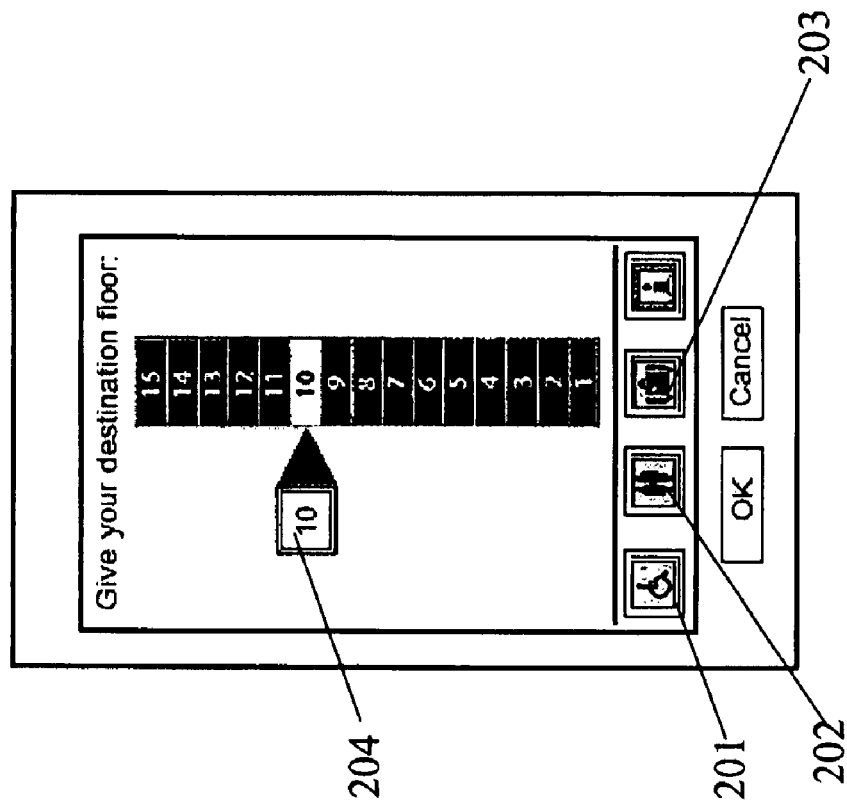
Figure 3:
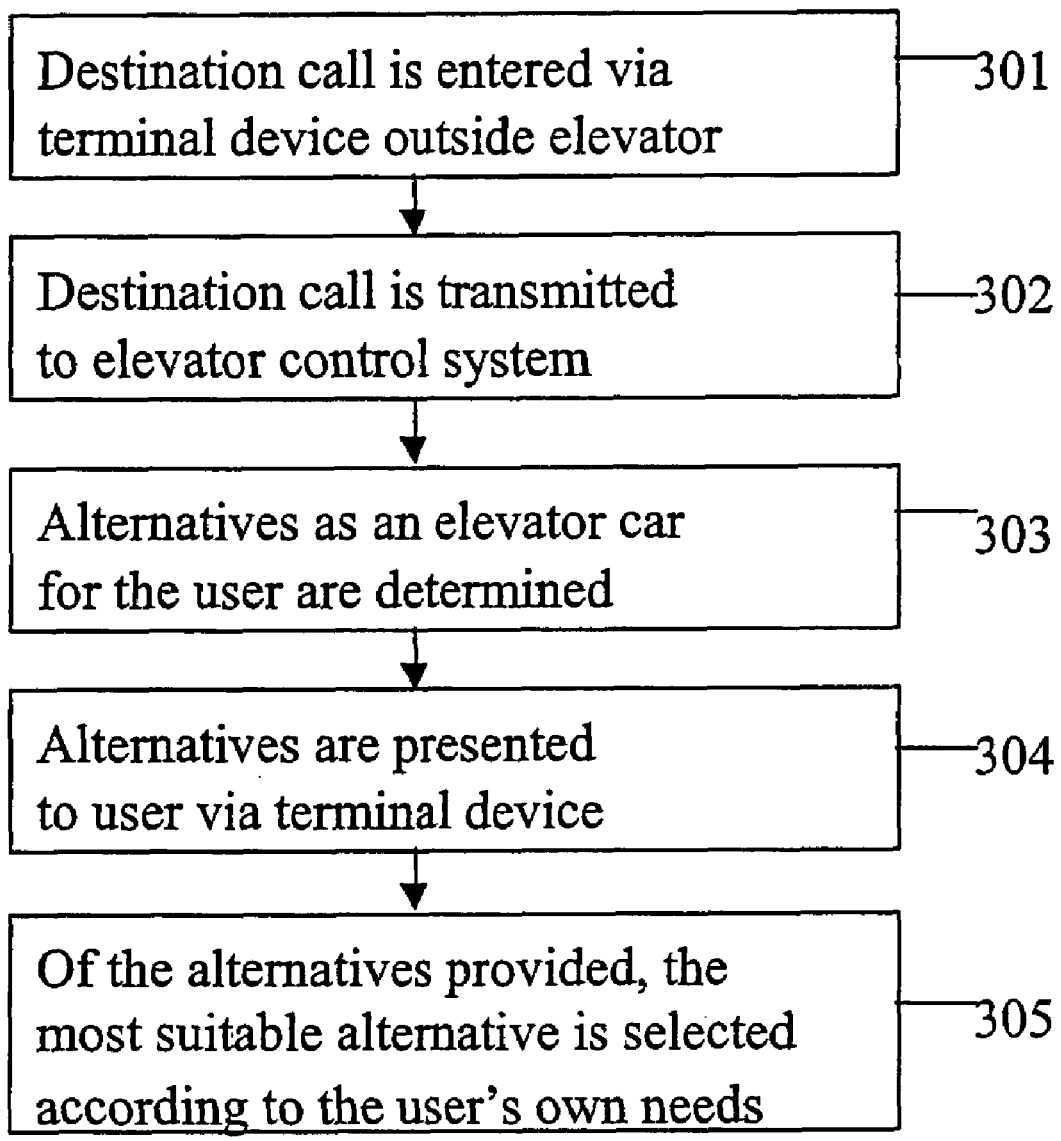

FIG. 1 presents a functional diagram of a destination floor elevator system according to the invention, FIGS. 2a and 2b present the display of the user interface of a passenger terminal device according to the invention, and FIG. 3 presents a flow diagram of the operation of the method of the invention.

DETAILED DESCRIPTION OF THE INVENTION

FIG. 1 presents a functional diagram of a destination floor elevator system according to the invention, which comprises: an elevator group 101 consisting of a plurality of elevators 102, 103, a portable passenger terminal device 104 for reserving elevators for use by passengers, a base station 105 and an elevator control system 106. Essential parts of the passenger terminal device 104 are a display, a keypad and a transmitter-receiver unit. The passenger terminal device 104 has been arranged to receive a destination call and to send it to the control system 106 of the elevator group via the base station 105. The control system 106 of the elevator group has been arranged to define, taking other service requests into account, one or more alternatives as a transportation device for the user, from which the user selects via the passenger terminal device 104 the alternative best suited to his/her personal needs.

The passenger terminal device 104 may be e.g. one of the following devices: a passenger terminal device in general use, a mobile station, a terminal in a data communication network, a terminal in a telecommunication network, and/or a wireless terminal.

FIGS. 2a and 2b present the display of the user interface of a passenger terminal device according to the invention. If the user so desires, he/she can select on the passenger terminal device a functional mode 201-203, which will be taken into account by the control system when determining the elevator alternatives to be proposed to the user. The functional mode may relate e.g. to information given by the user regarding bulky luggage the user is carrying with him/her. In this case, the control system will not allocate the same elevator to other users of the system. The terminal device can also be personalized to present the information provided by the elevator system in a way that takes into account the user's own properties, so the user will find the device as visual and easy-to-use as possible. The user can e.g. choose to receive all information provided by the control system either in visual, numerical, audio or audiovisual form.

Using the passenger terminal device, the user enters a destination call 204, which is transmitted to the elevator control system. In addition, the user can give other criteria, which will be taken into account by the control system when determining transportation-alternatives for the user (not shown in FIG. 2a or 2b). These criteria may relate e.g. to parameters like the following: waiting time, degree of admission of device during transportation, total traveling time, possible cost, device type (panoramic-non-panoramic, size, etc.), device mode (steady or sportive), location of transportation device (e.g. proximity), energy consumption of transportation device (the user may e.g. want a low energy consumption when moving from place to place), outfit of device (interior decoration or additional properties such as displays or the like) or some other criterion selected by the user.

After the user has entered a destination call and selected a possible mode, the terminal device presents to the user by means of the passenger terminal device the alternatives 205 regarding the user's transportation device. The user selects from among the proposed alternatives the one that suits him/her best and moves on to await the elevator.

FIG. 3 presents a flow diagram of the operation of the method of the invention. Implementation of the method of the invention starts from step 301, where the user inputs his/her destination floor to the passenger terminal device. The call is transmitted together with starting floor data to the elevator control system 302, which determines one or more alternatives as a transportation device 303 for the user. The alternatives are presented to the user via the terminal device 304, whereupon the user selects the most suitable alternative from among those presented. The elevator control system allocates the selected elevator to the user and the user moves on to await the elevator.

In the destination floor elevator system according to the invention, elevator allocation is performed e.g. by optimizing utilization factors of the elevator and/or using criteria given by the user regarding the passenger's own preferences. 'Utilization factors' refers e.g. to the degree of utilization of the elevator or the energy consumption of the elevator. 'Passenger's own preferences' refers to total traveling time, waiting time, degree of admission of the device during transportation, etc., as already mentioned above.

Although the transportation service mentioned in the above examples is an elevator system, especially a destination floor elevator system, the invention can be applied e.g. in any automated people transportation system. The invention is applicable e.g. in an automated people transportation system as used at airports to transport passengers from one terminal to another or from a parking facility to terminals.

An automated transportation system would also be applicable as an alternative in public transport in a kind of automated taxi/bus system. The passenger calls a carriage to the halting place and selects a device to travel to a desired destination stop.

The invention is not exclusively limited to the embodiment examples described above; instead, many variations are possible within the scope of the inventive concept defined in the claims.

The invention claimed is:

1. A method for controlling a transportation system, the method comprising:
    entering a personal service request via a portable passenger terminal device to a control system of a transportation device group in a transportation system, wherein said transportation device group comprises a plurality of transportation devices,
    determining on the basis of the service request one or more suitable transportation devices to fulfill said request, wherein the determined one or more suitable transportation devices comprise a subset of the transportation devices in the transportation device group,
    presenting the determined one or more suitable transportation devices for selection via the portable passenger terminal device; and
    allocating one of the one or more suitable transportation devices as the transportation device to fulfill said personal service request based on the selection made via the portable passenger terminal device.

2. A method according to claim 1, wherein the transportation system is an elevator system and the service request contains a destination call in the elevator system.

3. A method according to claim 1, the method further comprising:
    adding to the service request at least one user-specific personal criterion to be used in said determining step.

4. A method according to claim 3, wherein the personal criterion comprises at least one of:
    waiting time of the person needing the service,
    total traveling time,
    degree of admission of the transportation device during transportation,
    cost,
    type of transportation device,
    mode of transportation device,
    location of transportation device,
    energy consumption of transportation device, or
    outfit of transportation device.

5. A method according to claim 1, the method further comprising:
    selecting via the portable passenger terminal device a user-specific functional mode.

6. A method according to claim 1, wherein said determining comprises optimizing utilization factors of the transportation devices.

7. A method according to claim 6, wherein the utilization factors of the transportation device are determined on the basis of the degree of utilization of the transportation device or the energy consumption of the transportation device.

8. A transportation system, comprising:
    a transportation device group comprising a plurality of transportation devices
    a portable passenger terminal device that calls and reserves transportation devices, and a control system that controls the transportation devices in the transportation group in response to commands from the aforesaid portable passenger terminal device, wherein the portable passenger terminal device comprises a terminal transmission portion that transmits a user-initiated service request to the control system, the control system comprises a determination portion that determines, using the transmitted service request, one or more suitable transportation devices to fulfill said request and a control transmission portion that transmits information regarding the suitable transportation devices to the portable passenger terminal device, wherein the suitable transportation devices comprise a subset of the plurality of transportation devices, the terminal transmission portion further transmits selection information back to the control system, wherein selection information is generated by a terminal selection portion and comprises information regarding a particular, selected transportation device chosen from among the suitable transportation devices, and the control system further comprises an allocation portion that allocates the particular selected transportation device to fulfill the service request.

9. A transportation system according to claim 8 wherein the transportation system is an elevator system and the service request contains a destination call in the elevator system.

10. A system according to claim 8, wherein the portable passenger terminal device transmits, as part of the user-initiated service request, at least one user-specific personal criterion to said control system, and further wherein said determination portion uses said criterion when determining said one or more suitable transportation devices.

11. A system according to claim 10, wherein the personal criterion comprises at least one of:

waiting time of the person needing the service,
total traveling time,
degree of admission of the transportation device during transportation,
cost,
type of transportation device,
functional mode of transportation device,
location of transportation device,
energy consumption of transportation device, or
outfit of transportation device.

12. A system according to claim 8, wherein the terminal selection portion designates a user-specific functional mode for the portable passenger terminal device.

13. A system according claim 8, wherein the control system comprises a utilization determination portion that determines said one or more suitable transportation devices by optimizing utilization factors of the transportation devices.

14. A system according to claim 13, wherein the utilization determination portion determines the utilization factors of the transportation devices on the basis of the degree of utilization or energy consumption of the transportation device.

15. The method according to claim 1, the method further comprising:

entering general service request with a general transportation device call unit disposed in a fixed location of said transportation system; and allocating a transportation device to fulfill said general service request based on the location of said general transportation device call unit in said system.

16. The system of claim 8, the system further comprising:

a general transportation device call unit disposed in a fixed location of said transportation system; and where the allocation portion allocates a transportation device to fulfill a general service request initiated by said general transportation device call unit based on the location of said general transportation device call unit in said system.

* * * * *